July 19, 1932.  G. A. SHAMBERGER  1,867,990
THERMOMETER
Filed April 27, 1931
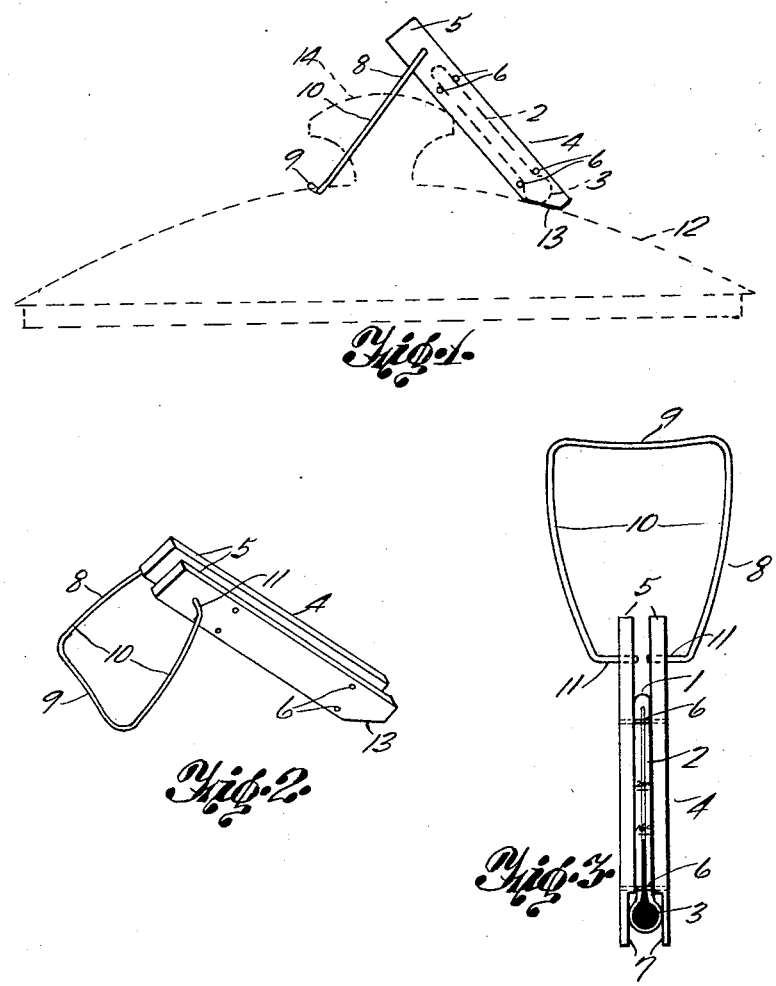
INVENTOR:
George Adams Shamberger
BY Adam E. Fisher
ATTORNEY Patented July 19, 1932

1,867,990

UNITED STATES PATENT OFFICE

GEORGE ADAMS SHAMBERGER, OF SHAW, OREGON

THERMOMETER

Application filed April 27, 1931. Serial No. 533,045.

This invention relates to thermometers and the main object of the invention is to provide a thermometer adapted for mounting on the top or lid of a waterless cooker to indicate the temperature of the contents thereof so that the desired uniform temperature may be maintained by an adjustment of the heat or flame beneath the cooker to keep the temperature as indicated by the thermometer constantly at the desired point.

Another object is to provide a thermometer for this purpose which is provided with a carrying and supporting frame so constructed that the thermometer may be used upon cooking vessels of any form.

A further object is to provide a device of this kind in a simple, inexpensive and durable form.

With these and other objects in view the invention resides in the novel construction and arrangement as hereinafter set forth and claimed, reference being had to the accompanying drawing wherein:

Figure 1 is a side view of the thermometer as mounted on the lid of a cooking utensil, the said lid being shown in dotted lines.

Figure 2 is a perspective view of the thermometer.

Figure 3 is an elevation of the thermometed as detached from the cooking utensil and with the supporting stand swung outward as a means for hanging the thermometer up.

In carrying out the invention I provide a thermometer 1 of substantially conventional form comprising the stem 2 and bulb 3, the former being graduated to indicate temperatures of 160 and 200 degrees Fahrenheit, or any other desired temperatures. A frame or holder 4 is provided for the thermometer 1, the same being formed by the two side members 5 adapted to engage the thermometer stem 2 at opposite sides thereof in such manner as to leave the graduations visible as shown. The side members 5 are secured together with the thermometer gripped therebetween by the pins or rivets 6 and are recessed on their inner faces near one end at 7 to accommodate the bulb 3 which is of greater diameter than the stem 2. A stand 8 is provided and the same is formed of a length of wire bent to a substantially U-shaped conformation and comprising the relatively wide bight 9 and the spaced legs 10. The ends 11 of the legs 10 are bent inwardly and are pivotally inserted in the frame side members 5 adjacent the end thereof remote from the thermometer bulb 3.

The device thus formed is adapted to be mounted on a cooking utensil top as shown in the dotted lines 12 in Figure 1, the frame 4 and its enclosed thermometer 1 being supported in an angular position by the stand 8 in the manner illustrated. The bulb 3 is thus brought close to the surface of the top 12 and to further bring about this close relationship of the bulb and top the ends of the side members 5 are beveled off at 13 flush or substantially flush with the surface of said bulb 3. The bight 9 of the stand 8 is bent to an arcuate form to closely follow the contour of the rounded form of top 12 as here shown. The stand 8 may be set over the knob or handle 14 of the top 12 with the legs 10 embracing the sides of the knob 14 to hold the device in place on the top. When the device is set on a flat top this engagement of the stand and knob is of course unnecessary. When swung to the position shown in Figure 3 the stand 8 serves as a handy loop or bail by which the device may be hung up when not in use.

From the foregoing it will be apparent that I have provided a simple and effective structure for the purposes set out. The thermometer is sufficiently accurate for its purpose and any variation in readings caused by the difference in thickness of the top upon which it rests or the tightness with which the top engages the cooking vessel or by other causes may be determined by filling said vessel with water and boiling. The thermometer is calibrated to register 160 degrees when the water boils and the variation can thus be determined and taken into account during the actual cooking operation. The temperature within and without the cooking vessel will be different but this difference is compensated for in the calibration and graduation of the thermometer.

While I have herein set forth a certain preferred embodiment of my invention it is understood that I may vary from the same in minor structural details so as best to construct a practical device for the purposes intended, not departing from the spirit of the invention and within the scope of the appended claim.

I claim:

In a device of the kind described, a frame comprising spaced side members, a thermometer including a stem and bulb mounted between the said side members, the said side members being beveled off at their corners at one end flush with the surface of the bulb, a stand comprising a bight portion and spaced legs, the ends of the said legs being pivoted to the frame side members at the ends thereof opposite the thermometer bulb.

In testimony whereof I affix my signature.

GEORGE ADAMS SHAMBERGER.